Nov. 6, 1928. 1,691,015
F. LEISTER
LUBRICATING MEANS FOR ANTIFRICTION BEARINGS
Filed Dec. 11, 1926
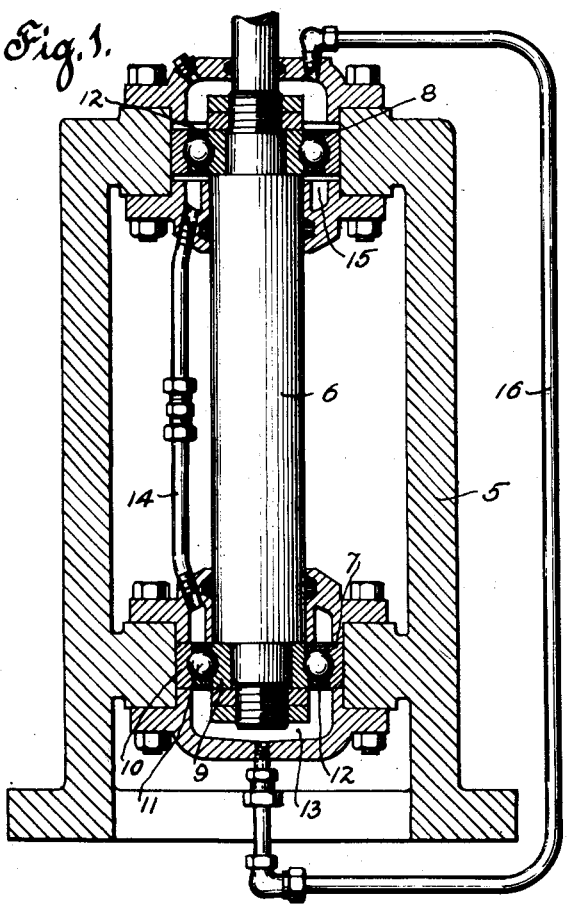
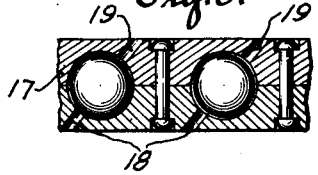
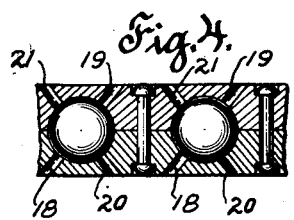
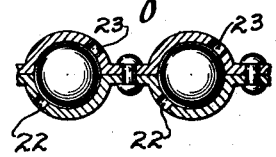
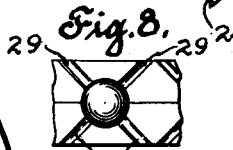
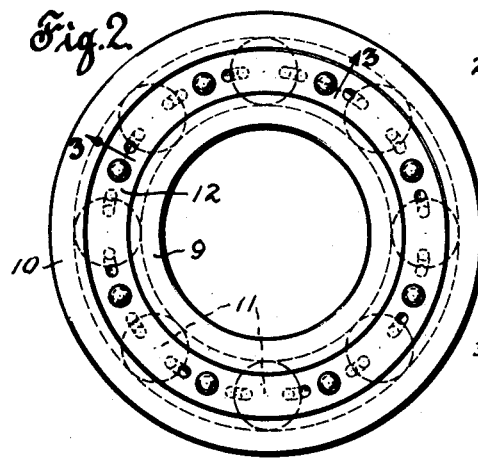
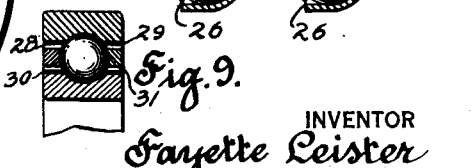
INVENTOR
Fayette Leister
BY
Mitchell Bechut
ATTORNEYS.

Patented Nov. 6, 1928.

1,691,015

UNITED STATES PATENT OFFICE.

FAYETTE LEISTER, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

LUBRICATING MEANS FOR ANTIFRICTION BEARINGS.

Application filed December 11, 1926. Serial No. 154,115.

My invention relates to means for lubricating bearings.

In certain situations, particularly where bearings rotate at comparatively high speeds, effective lubrication is a serious problem; for example, in certain wood-working machines where antifriction bearings are employed, the shafts usually rotate at the comparatively high speeds of three to seven thousand revolutions per minute. The retainers usually employed in connection with antifriction bearings often form, at these high speeds, an effective seal against the entry of lubricant and the bearing then runs dry or with insufficient lubricant. In order to lubricate such high speed bearings, it has been the practice to provide a special oil pump for forcing the lubricant into the bearing.

It is the principal object of the present invention to overcome many of the difficulties of lubricating antifriction bearings.

It is a further object to provide an antifriction bearing which embodies pumping means for effectively conducting lubricant to the surfaces to be lubricated.

Briefly stated, in the preferred form of the invention I employ an antifriction bearing in which a retainer or other means may be employed to practically seal the space between the inner and outer raceway members, when the shaft supported by the bearing rotates at high speed. One of the rotating parts of the bearing (preferably a retainer) is provided with pumping means preferably in the form of an angular opening through the rotating member and extending in a generally axial direction. Lubricant is supplied to the bearing so as to prime the pumping means which then forces lubricant to the bearing surfaces of the bearing.

In the drawings which show, for illustrative purposes only, preferred forms of the invention—

Fig. 1 is a sectional view illustrating one embodiment of the invention;

Fig. 2 is an enlarged end view of a bearing illustrating features of the invention;

Fig. 3 is a sectional view taken substantially along the lines 3—3 of Fig. 2;

Fig. 4 is a view similar to Fig. 3, but illustrating a slight modification;

Figs. 5, 6, and 7 are views similar to Fig. 3 illustrating further modifications;

Fig. 8 is a fragmentary edge view of a retainer showing a further modification of the invention;

Fig. 9 is a fragmentary, sectional view of the retainer shown in Fig. 8 embodied in the bearing.

In the application of the invention illustrated in Fig. 1, 5 indicates a support or housing for a rotating shaft 6. This shaft is supported upon a lower antifriction bearing 7 and a corresponding upper bearing 8. Each bearing unit in the illustrative form shown in Fig. 2, is a combined radial and thrust bearing and embodies an inner race ring 9 and an outer ring 10, with antifriction bearing members in the form of balls 11 interposed between the race rings. A ball spacer 12 serves to hold the balls 11 in proper spaced relation and this spacer nearly spans the space between the inner and outer race rings. Below the bearing 7 (Fig. 1) is an oil reservoir 13, and the oil is preferably maintained in this reservoir up to or slightly above the level of the lower retainer 12. A conduit 14 serves to connect the space above the lower bearing 7 with a reservoir 15 below the upper bearing 8. A return pipe or conduit 16 is connected to the space above the upper bearing 8 and to the lubricant reservoir 13. A shaft thus supported upon the two bearings 7 and 8 is suitably packed to prevent the leaking out of lubricant during the rotation of the shaft. It will be seen that lubricant conducted from the reservoir 13 and through the lower bearing 7 may pass up through the connection 14 to the upper bearing 8, and through that bearing into the return pipe 16, which conducts the oil back to the reservoir 13. The embodiment shown in Fig. 1 is merely an illustration of one use to which the invention to be described may be put.

In that form of the invention shown in Fig. 3, spacer 17 is of the solid block type, usually of cast bronze, and this retainer preferably approaches quite near to the inner and outer raceway members of the antifriction bearing so that when the spacer rotates at a comparatively high speed, it serves as a relatively effective seal. The spacer is provided with one or more angular openings or bores 18—19 extending from one end to the other end of its bearing unit formed in the spacer and communicating with one or more of the ball pockets. Now, it will be clear that when a bearing embodying a spacer, as disclosed in Fig. 3, is rotated so as to cause the retainer to rotate toward the left as viewed in Fig. 3, oil, which is supplied to the lower side of the retainer, will enter the apertures 18, and, due to the rotation of the retainer as indicated, it will in effect pump the oil in an axial direction into the ball pocket where the oil will serve to lubricate the surfaces between the balls and the retainers as well as between the balls and the raceway members. Oil, after passing through the oil pockets or spaces between raceway members, is ejected through the discharge passages 19 by axial impulse.

In that form shown in Fig. 4, the same inlet openings 18—18 and discharge openings 19—19 are provided, and, in addition, I have formed inlet openings 20—20 and discharge openings 21—21, which extend opposite to corresponding openings 18—19. Rotation of the spacer shown in Fig. 4 in either direction will thus cause oil to be pumped to the bearing pockets. It is probable that some of the oil pumped into the bearing pocket, say, through the openings 18, will be pumped out of the ball pockets by the pumping apertures 20—20, but the quantity so pumped out will be small and a large part of the lubricant will be distributed over the bearing surfaces to be lubricated.

In the form shown in Fig. 5, the spacer is of a slightly different type from that shown in Figs. 3 and 4, and that particular form does not seal the space between the inner and outer rings quite so effectively as do those shown in Figs. 3 and 4. The spacer of Fig. 5, however, is provided with one or more inlet pumping openings 22—22 and discharge openings 23—23. The action of that form shown in Fig. 5 is substantially the same as those previously described.

Fig. 6 illustrates a pressed metal spacer in which, instead of having holes drilled in at an angle, the metal may be slitted as shown, and lips 24—24 struck out so as to provide, in effect, angular openings performing the functions of those heretofore described, and these lips will serve to pick up the lubricant and force the same into the ball pockets and out through corresponding discharge openings 25—25. The inlet and outlet openings 24—25, as shown in Fig. 6, are on perpendicular, axial planes through the ball centers as viewed in Fig. 6.

In the form shown in Fig. 7, the pressed metal spacer is slitted at opposite sides on planes through the center of the ball inclined to the perpendicular as viewed in Fig. 7. The inlet openings 26—26 and exit openings 27—27 are thus formed and the action will be substantially the same as heretofore described. It will be obvious without illustration that all of those spacers shown in Figs. 5, 6 and 7 may be provided with other openings after the fashion illustrated in Fig. 4.

In Fig. 8, I have illustrated a spacer, which, instead of having holes formed directly through the sides of the retainer, is provided with inlet grooves 28—28 and exit openings 29—29 on the outer or inner surface of the retainer. Fig. 9, illustrating a section through a bearing embodying that form shown in Fig. 8, clearly shows the location of the grooves 30—31 on the inner periphery corresponding to grooves 28—29 in the outer surface. Upon rotation of the spacer shown in Figs. 8 and 9, lubricant will be conducted through the bearing and to the ball pockets and bearing surfaces in the manner heretofore described.

It has been found in practice that a bearing embodying a pumping element in a rotating member (preferably the spacer) will serve to raise oil a considerable distance depending upon the speed of rotation, the characteristics of the pumping element, etc., and that two or more bearings as shown by way of example in Fig. 1, may be effectively lubricated.

The invention is applicable to many fields where lubrication difficulties have been experienced, and by way of example the woodworking industry and the deep well pump field may be mentioned.

While several modifications have been illustrated, I do not wish to be confined to those particular forms nor to the specific means for effecting the pumping action so long as the construction gives to the oil an axial impulse from one to the other end of the bearing unit, for many other embodiments, within the scope of the invention, will occur to those skilled in the art.

I claim:

1. In a device of the character described, inner and outer raceway members, antifriction bearing members interposed therebetween, a retainer member for said antifriction bearing members, said retainer member having pumping means embodied therein whereby upon rotation of said retainer member lubricant will be pumped to the anti-friction bearing members and axially through said bearing.

2. In a device of the character described, inner and outer bearing members, antifriction bearing members interposed therebetween, a retainer member substantially sealing the space between said bearing members, said retainer having an angularly extending opening therein whereby upon rotative movement of said retainer lubricant will be pumped in an axial direction through said opening.

3. In an anti-friction bearing, two concentric race rings, anti-friction bearing members therebetween, and means between said rings to retain said anti-friction bearing members in proper spaced relation and to force lubricant from one side of said bearing to the other side thereof.

FAYETTE LEISTER.